(12) United States Patent
Matsuoto et al.

(10) Patent No.: US 8,976,255 B2
(45) Date of Patent: Mar. 10, 2015

(54) IMAGING APPARATUS

(75) Inventors: Hideaki Matsuoto, Fuchu (JP); Osamu Nonaka, Sagamihara (JP); Kenichi Horie, Machida (JP); Kensei Ito, Sagamihara (JP); Yoshiyuki Fukuya, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 254 days.

(21) Appl. No.: 13/405,984

(22) Filed: Feb. 27, 2012

(65) Prior Publication Data

US 2012/0218431 A1  Aug. 30, 2012

(30) Foreign Application Priority Data

Feb. 28, 2011 (JP) ................... 2011-042871

(51) Int. Cl.
*H04N 5/225* (2006.01)
*H04N 5/232* (2006.01)
*H04N 5/272* (2006.01)

(52) U.S. Cl.
CPC ......... *H04N 5/2258* (2013.01); *H04N 5/23219* (2013.01); *H04N 5/272* (2013.01)
USPC ...................... 348/218.1; 348/222.1; 382/190

(58) Field of Classification Search
USPC ............. 348/218.1, 262, 264, 222.1; 382/190
See application file for complete search history.

(56) References Cited

U.S. PATENT DOCUMENTS

| | | | |
|---|---|---|---|
| 2005/0036044 A1* | 2/2005 | Funakura ...................... | 348/239 |
| 2006/0044396 A1* | 3/2006 | Miyashita et al. ....... | 348/207.99 |
| 2009/0244296 A1 | 10/2009 | Petrescu | |
| 2011/0193993 A1* | 8/2011 | Yeom et al. ................. | 348/231.3 |
| 2013/0021447 A1* | 1/2013 | Brisedoux et al. .............. | 348/47 |
| 2013/0120602 A1* | 5/2013 | Huang ....................... | 348/218.1 |

FOREIGN PATENT DOCUMENTS

| | | |
|---|---|---|
| JP | 2004-147046 | 5/2004 |
| JP | 2005-094741 | 4/2005 |
| JP | 2005-130140 | 5/2005 |
| JP | 2006-203600 | 8/2006 |
| JP | 2007-026246 | 2/2007 |
| JP | 2008-140107 | 6/2008 |
| WO | WO 2010-018287 | 2/2010 |

OTHER PUBLICATIONS

Office Action from corresponding Japanese Patent Application Serial No. 2011-042871 (3 pgs.), mailed Jan. 6, 2015, with translation (4 pgs.).

* cited by examiner

*Primary Examiner* — Paul Barardesca
(74) *Attorney, Agent, or Firm* — John C. Pokotylo; Straub & Pokotylo

(57) ABSTRACT

An imaging apparatus includes a first and a second imaging unit, a clipping unit, an image processing control unit. The first imaging unit is provided on a front face of an apparatus main body. The second imaging unit is provided on a back face of the apparatus main body. The clipping unit clips image data of the second main subject from the second acquired image data. The image processing control unit combines the first acquired image data with the image data of the second main subject clipped by the clipping unit to meet combining conditions determined by the first image data.

18 Claims, 16 Drawing Sheets

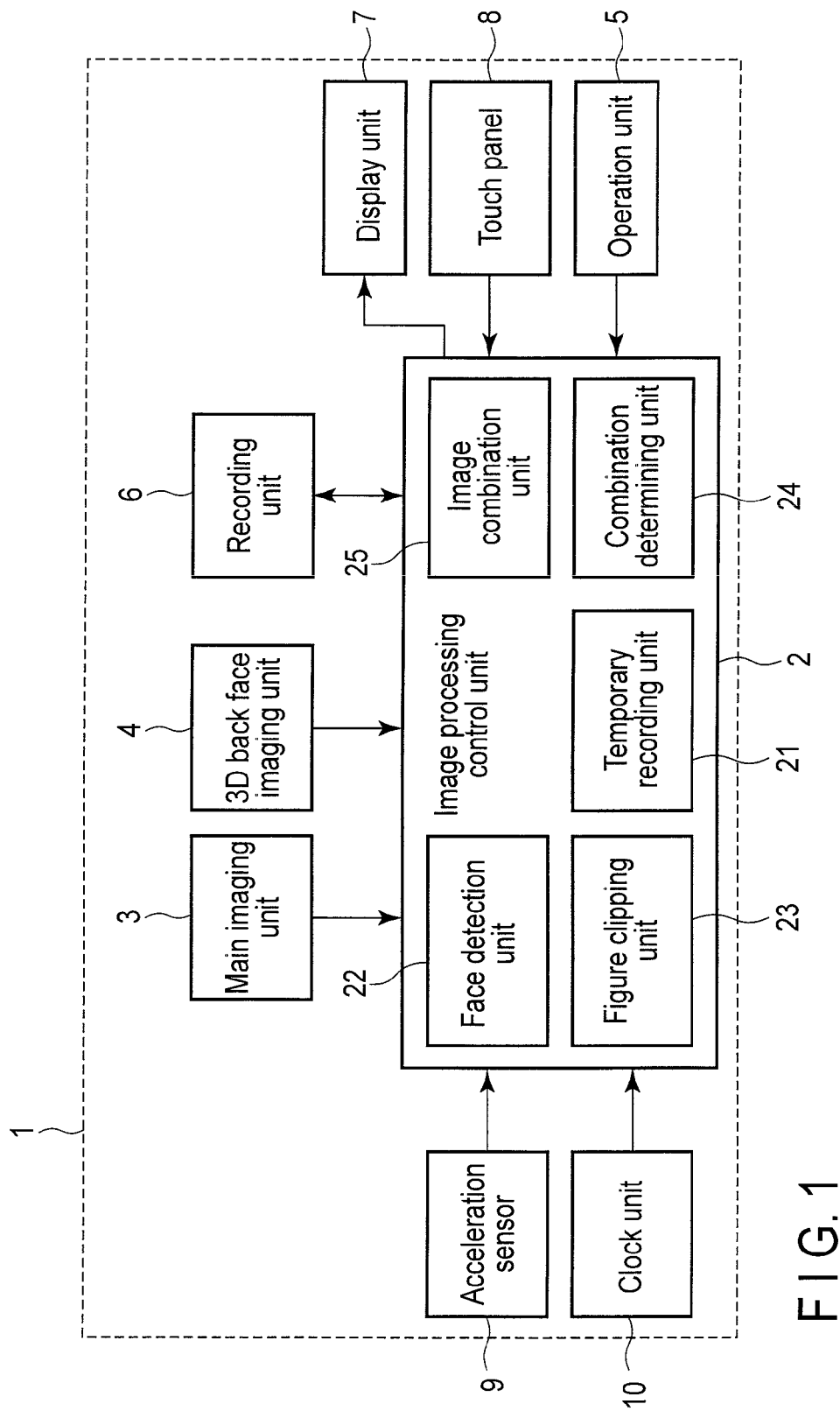
F I G. 1

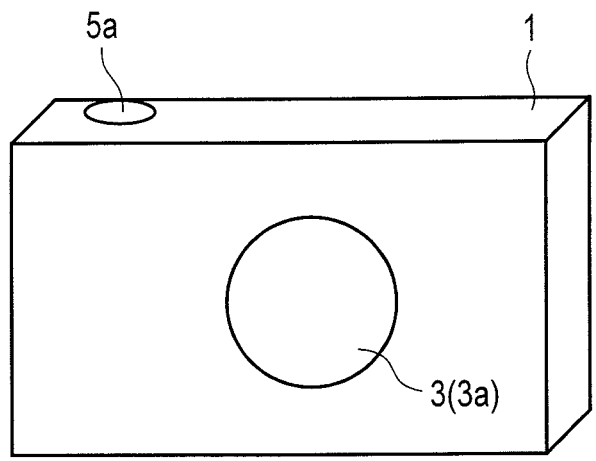
F I G. 2A
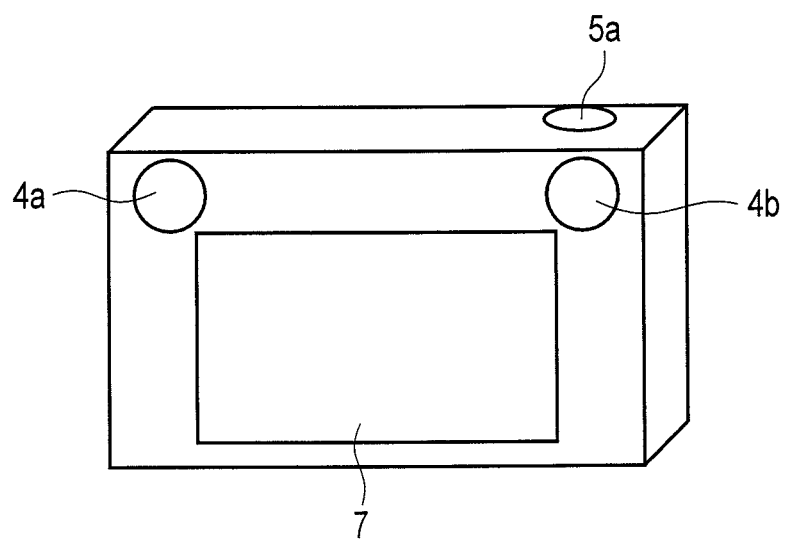
F I G. 2B

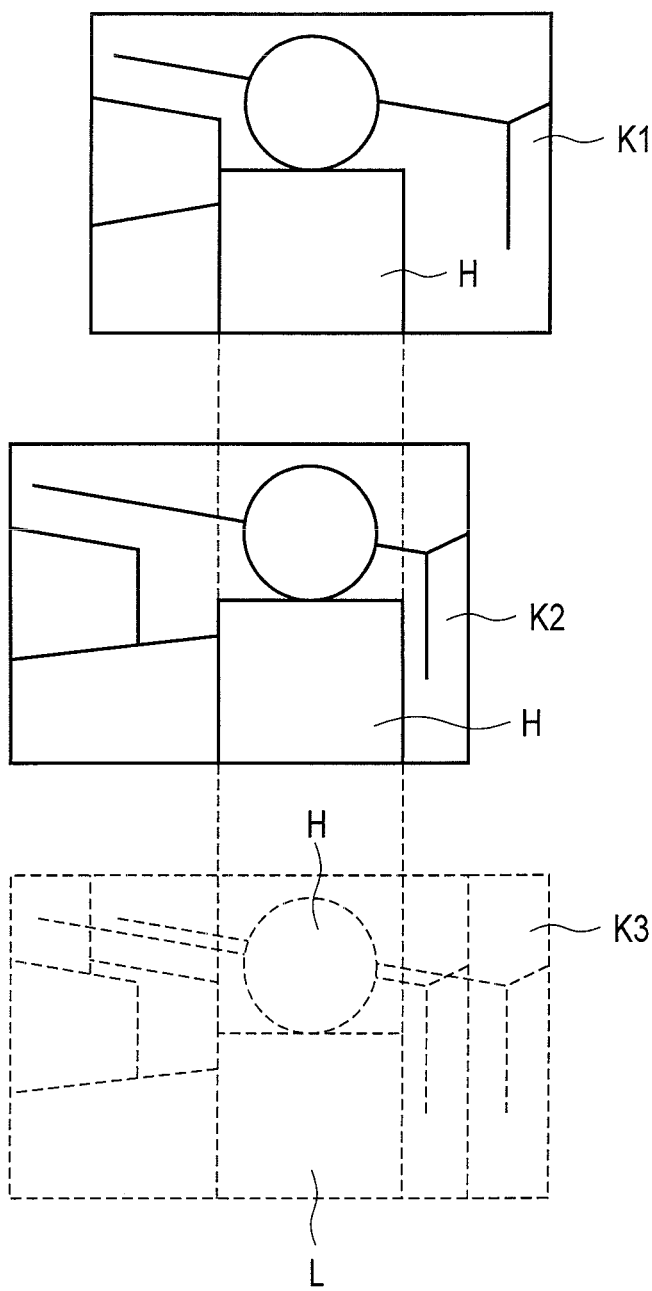
F I G. 5

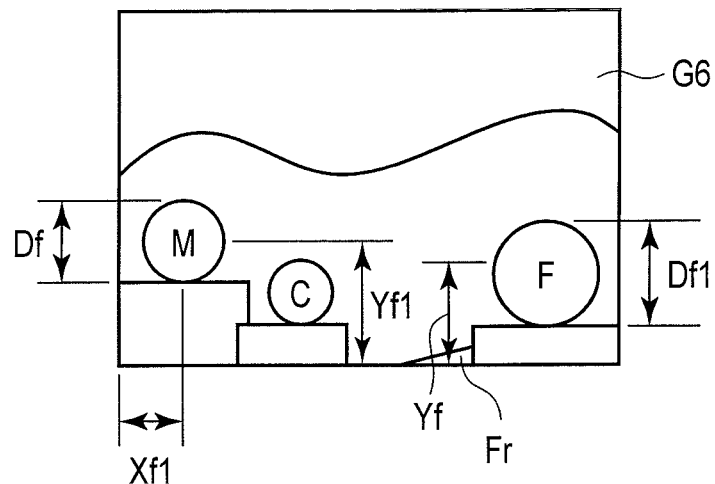
F I G. 15
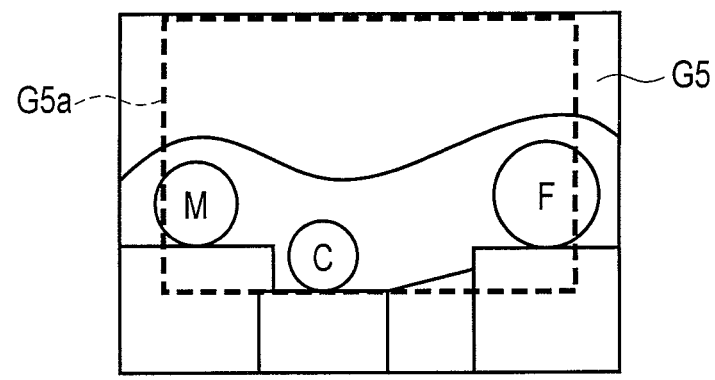
F I G. 16

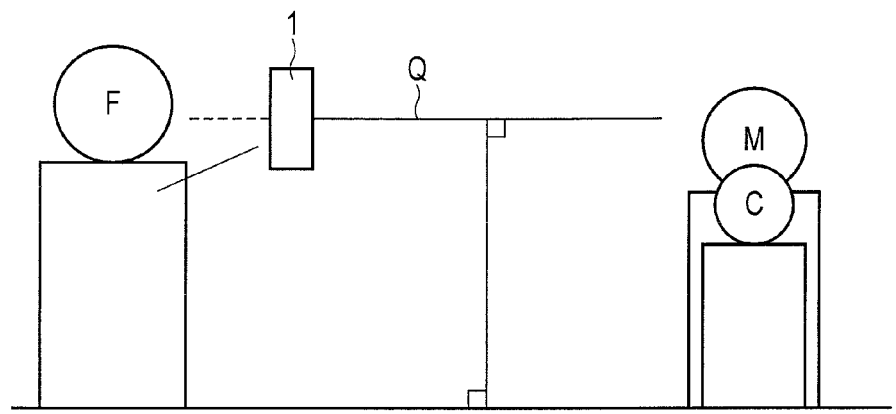
F I G. 17
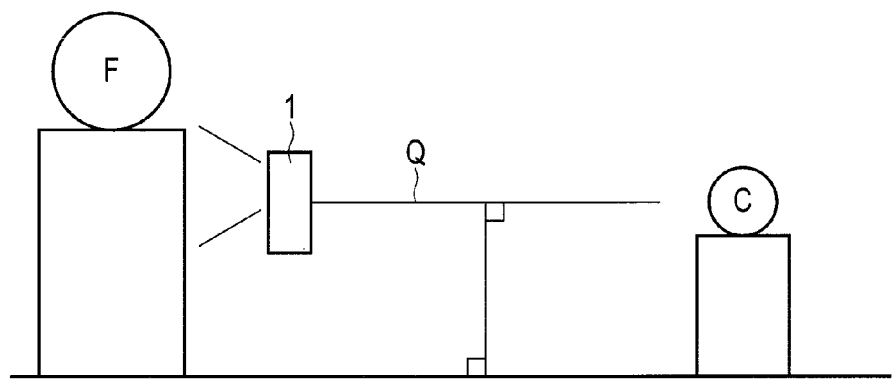
F I G. 18
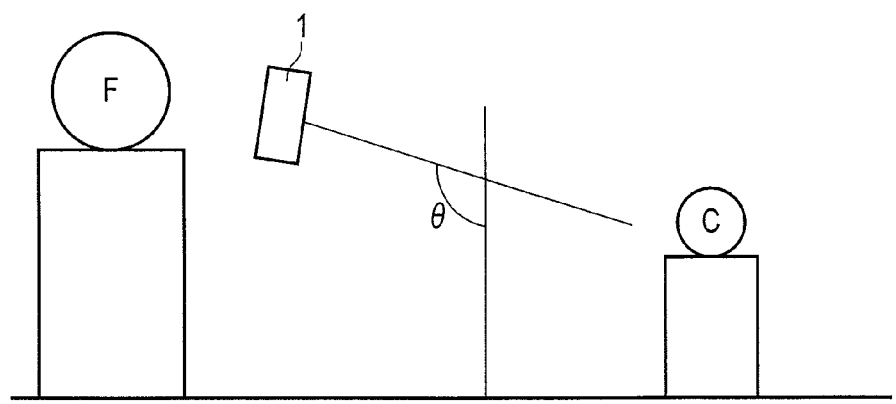
F I G. 19

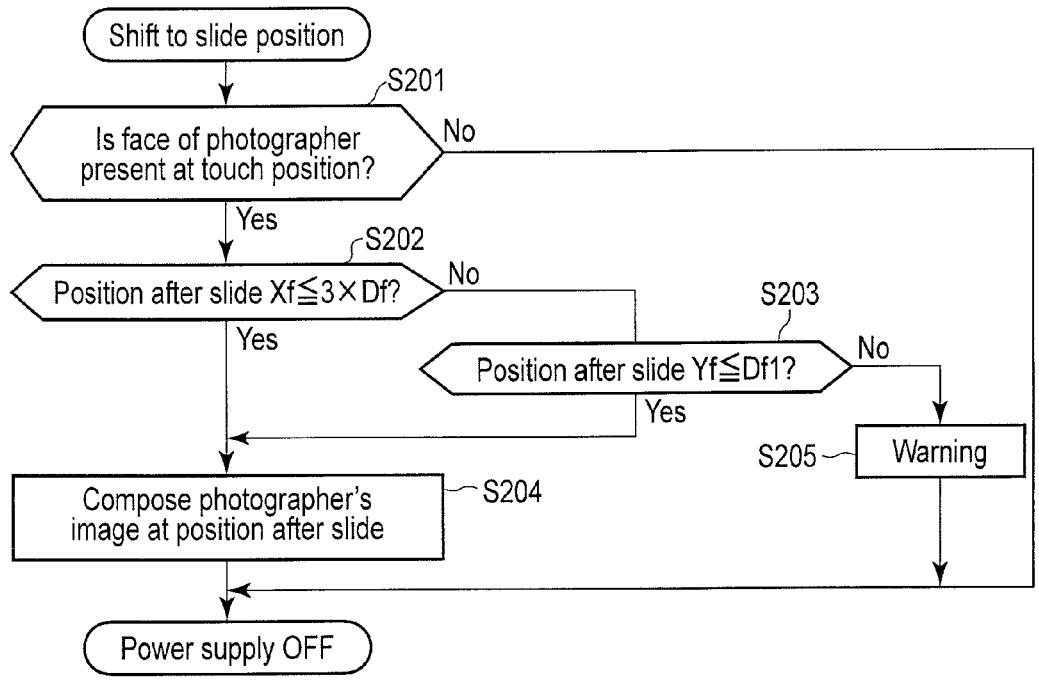
F I G. 21
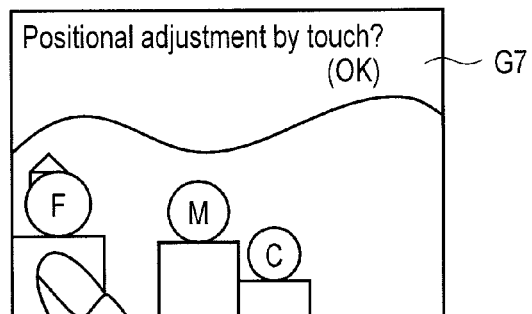
F I G. 22

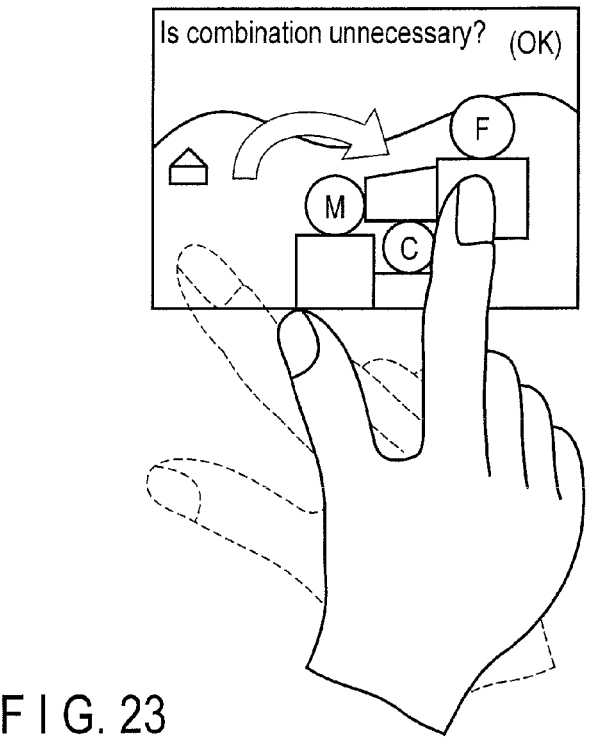
F I G. 23
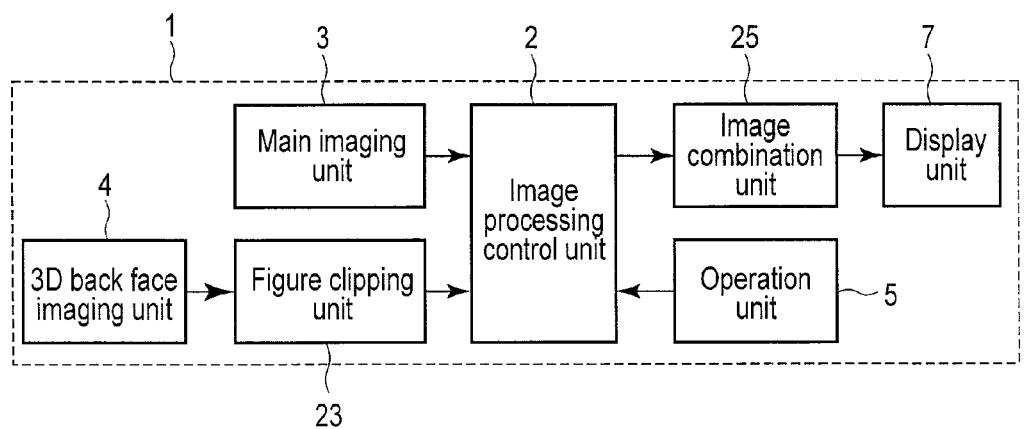
F I G. 24

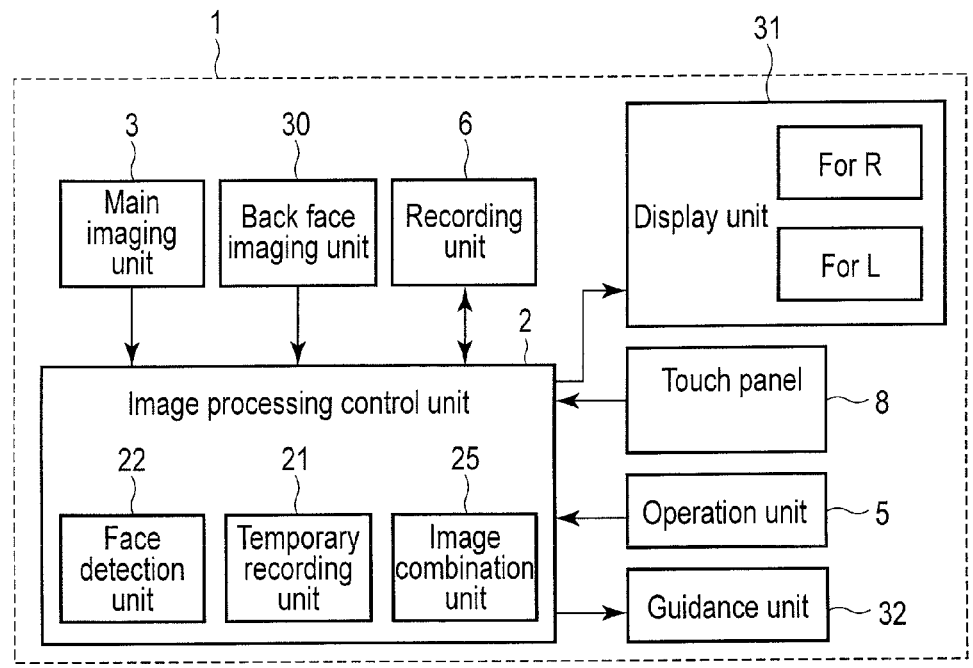
F I G. 25
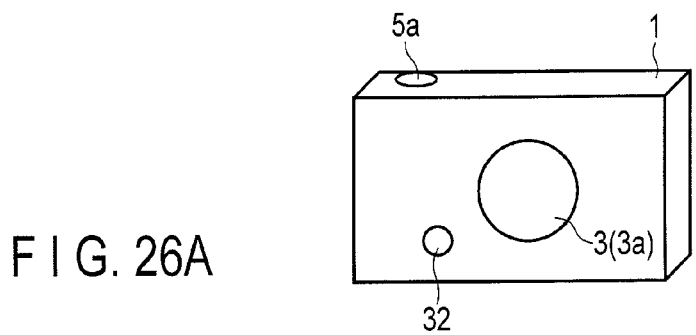
F I G. 26A
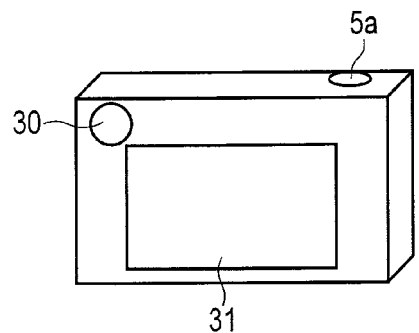
F I G. 26B

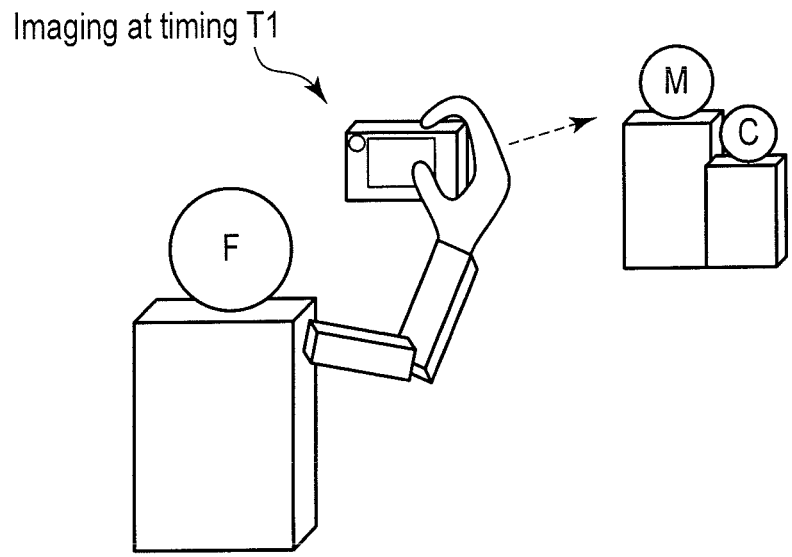
F I G. 27
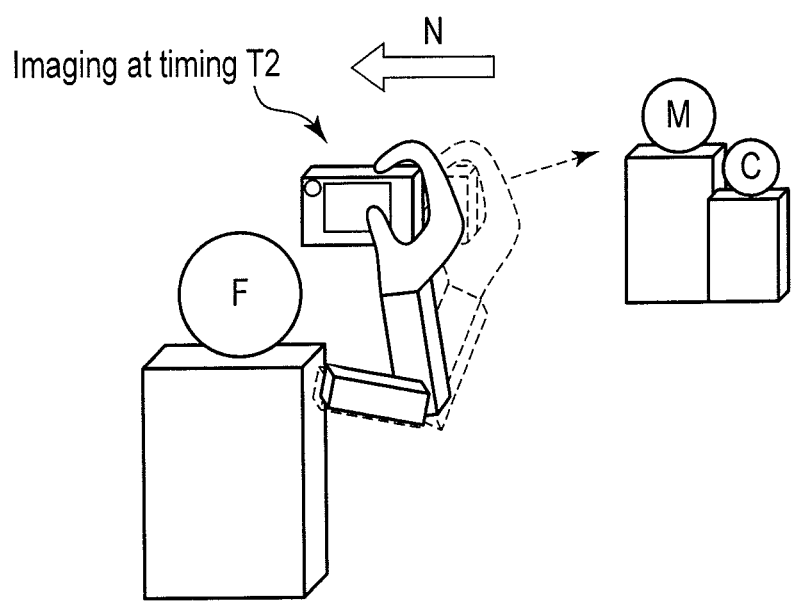
F I G. 28

Timing T1

Timing T2

IMAGING APPARATUS

CROSS-REFERENCE TO RELATED APPLICATIONS

This application is based upon and claims the benefit of priority from prior Japanese Patent Application No. 2011-042871, Feb. 28, 2011, the entire contents of which are incorporated herein by reference.

BACKGROUND OF THE INVENTION

1. Field of the Invention

The present invention relates to an imaging apparatus that can combine image data acquired by so-called self-photography, i.e., photographing, e.g., a facial part of a given person who is a main subject by himself/herself with image data acquired by an imaging unit provided on a back face of an apparatus main body.

2. Description of the Related Art

A technology of such an imaging apparatus is disclosed in, e.g., Jpn. Pat. Appln. KOKAI Publication No. 2004-147046. The gazette of Jpn. Pat. Appln. KOKAI Publication No. 2004-147046 discloses mounting a first camera on a first surface of a housing, mounting a second camera on a second surface which is a back side of the first surface of the housing, photographing a user's face by using the first camera, photographing a landscape the user is watching by using the second camera, performing photography using the first and second cameras at the same time, or combining respective images acquired by the first camera and the second camera to shoot a combined picture.

BRIEF SUMMARY OF THE INVENTION

According to aspect of the invention, there is provided an imaging apparatus comprising: a first imaging unit which is provided on a front face of an apparatus main body and images a first main subject to obtain first acquired image data; a second imaging unit which is provided on a back face of the apparatus main body and images a second main subject to obtain second acquired image data; a clipping unit which clips image data of the second main subject from the second acquired image data obtained by imaging of the second imaging unit; and an image processing control unit which combines the first acquired image data with the image data of the second main subject clipped by the clipping unit to meet combining conditions determined by the first image data.

According to aspect of the invention, there is provided an imaging system comprising: a first imaging unit which is provided on a front face of an apparatus main body and images a first main subject to obtain first acquired image data; a second imaging unit which is provided on a back face of the apparatus main body and images a second main subject to obtain second acquired image data; a clipping unit which clips image data of the second main subject from the second acquired image data obtained by imaging of the second imaging unit; an image processing control unit which combines the first acquired image data with the image data of the second main subject to meet present combining conditions, thereby creating combined image data; and a combination determining unit which makes at least one of a judgment upon a picture composition of the first acquired image data including the first main subject as the combining conditions, a judgment whether a combination space for the second main subject is present in the first acquired image; and a judgment whether combining the image data of the second main subject clipped by the clipping unit with the first acquired image data is possible.

According to aspect of the invention, there is provided an imaging method using an imaging apparatus comprising: imaging a first main subject by a first imaging unit provided on a front face of an imaging apparatus main body to obtain first acquired image data; imaging a second main subject by a second imaging unit provided on a back face of the imaging apparatus main body to obtain second acquired image data; clipping image data of the second main subject from the second acquired image data; combining the first acquired image data with the clipped image data of the second main subject to create combined image data; detecting the facial part of the first main subject from the first acquired image data; and judging whether combining the image data of the second main subject clipped by the clipping unit with the first acquired image data is possible based on a position of the facial part in the creation of the combined image data.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a first embodiment of an imaging apparatus according to the present invention;

FIG. 2A is an outside drawing showing a front face of the apparatus;

FIG. 2B is an outside drawing showing a back face of the apparatus;

FIG. 5 is a schematic view for explaining a function for clipping image data of a user alone in the apparatus;

FIG. 15 is a view showing combined image data, in which the user's right hand is excluded from a picture composition of the image to hide the right hand, acquired by the apparatus;

FIG. 16 is a view showing combined image data, from which an image data portion of the user's right hand has been clipped, obtained by the apparatus;

FIG. 17 is a view showing an optimum inclined state at the time of photography in the apparatus;

FIG. 18 is a view showing an example of an inappropriate inclined state of the camera main body at the time of photography in the apparatus;

FIG. 19 is a view showing another example of an inappropriate inclined state of the camera main body at the time of photography in the apparatus;

FIG. 21 is a control flowchart of slide movement in the apparatus;

FIG. 22 is a view showing an operation for the slide movement of the user's image in the apparatus;

FIG. 23 is a view showing the slide movement of the user's image in the apparatus;

FIG. 24 is a block diagram showing functions of the apparatus in a simplified manner;

FIG. 25 is a block diagram showing a second embodiment of an imaging apparatus according to the present invention;

FIG. 26A is a front outside drawing showing the apparatus;

FIG. 26B is a back outside drawing showing the apparatus;

FIG. 27 is a view showing an imaging state when simultaneously performing imaging at first timing by a main imaging unit and a back face imaging unit in the apparatus;

FIG. 28 is a view showing an imaging state when simultaneously performing imaging at second timing by the main imaging unit and a back face imaging unit in the apparatus;

DETAILED DESCRIPTION OF THE INVENTION

Figure 3:
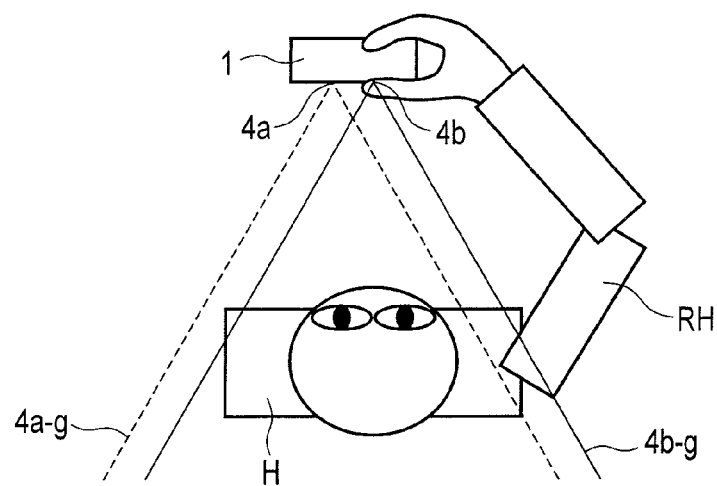
FIG. 3 is a view showing how a user performs self-photography using the apparatus.

A first embodiment according to the present invention will now be described hereinafter in detail.

FIG. 1 is a block diagram showing an imaging apparatus (a camera). FIG. 2A is an outside drawing of a front face of this apparatus. FIG. 2B is an outside drawing of a back face of this apparatus.

An image processing control unit 2 having a microcomputer mounted thereon is provided in an apparatus main body (a camera main body) 1. The image processing control unit 2 executes a previously stored camera control program to effect a series of operation control, e.g., a shutter operation, exposure processing, aperture adjustment, image processing, and others performed at the time of photography. Further, the image processing control unit 2 executes control over an imaging operation for obtaining acquired image data, control over a reproducing operation for recorded acquired image data, and others. To the image processing control unit 2 are connected a main imaging unit 3 as a first imaging unit, a back face imaging unit 4 as a second imaging unit, an operation unit 5, a recording unit 6, a display unit 7, a touch panel 8, an acceleration sensor 9 as a posture sensor, and a clock unit 10.

A lens optical system 3a of the imaging unit (which will be referred to as a main imaging unit hereinafter) is provided on a front face of the camera main body 1 as shown in FIG. 2A. A release button 5a as the operation unit 5 is provided on an upper portion of the camera main body 1.

The display unit 7 and a the back face imaging unit 4 are provided on a back face of the camera main body 1 as shown in FIG. 2B.

The main imaging unit 3 acquires an optical image from a subject including a first main subject such as a person and outputs a first image signal. The main imaging unit 3 images, e.g., a family of a user who performs photography. The main imaging unit 3 includes a lens optical system including a focus lens, a diaphragm, a shutter, and an imaging element. The main imaging unit 3 transmits an optical image from a subject to the imaging element through the lens optical system, the diaphragm, and the shutter. The imaging element converts the optical image from the subject into an image signal.

The back face imaging unit 4 is used for, e.g., self-photography for photographing the user himself/herself who performs photography. The back face imaging unit 4 acquires an optical image from the subject including a second main subject like a person, e.g., the user and outputs a second image signal. The back face imaging unit 4 includes a pair of three-dimensional (3D) imaging units, i.e., a left (L) imaging unit 4a and a right (R) imaging unit 4b. The imaging unit 4a and the imaging unit 4b have a parallax. The imaging unit 4a outputs a second image signal for acquiring left (L) parallax image data. The imaging unit 4b outputs a second image signal for acquiring (R) parallax image data. The left (L) parallax image data and the right (R) parallax image data have a parallax. Therefore, the back face imaging unit 4 outputs two second image signals for acquiring the two pieces of left and right (LR) parallax image data having the parallax.

The operation unit 5 accepts manual operations of the user. The operation unit 5 includes, e.g., a power supply button, a release button 5a, a reproduction button, a moving picture button, a self-photography button, and others. The operation unit 5 accepts operations such as switching of a moving picture mode or a still picture mode, switching to a self-photography mode, switching to a self-photography and image combination mode, adjustment of a diaphragm, and others.

The recording unit 6 records acquired image data obtained by the image processing control unit 2 at the time of photography, i.e., first acquired image data obtained by performing image processing to the first image signal output from the main imaging unit 3 and the two pieces of parallax image data obtained by performing image processing to the two image signals which are output from the back face imaging unit 4 and have a parallax.

The acceleration sensor 9 is provided to the camera main body 1. The acceleration sensor 9 detects a movement or a posture of the camera main body 1. For example, the acceleration sensor 9 which is of a triaxial type is used to enable recognizing a level or a direction of acceleration applied when the camera main body 1 is moved. The acceleration sensor 9 also outputs a signal associated with gravitational acceleration. The image processing control unit 2 can determine a posture, e.g., an inclination of the camera main body 1 by processing the signal associated with the gravitational acceleration output from the acceleration sensor 9.

In case of detecting a movement of the camera main body 1, a magnetic field sensor and the like can be also used besides the acceleration sensor 9. The magnetic field sensor determines an orientation in which the camera main body 1 is aimed. The image processing control unit 2 uses the orientation determined by the magnetic field sensor as an aid when determining a movement of the camera main body 1. The movement of the camera main body 1 may be determined based on an output signal from the acceleration sensor or the magnetic field sensor.

The clock unit 10 counts passage of time.

The image processing control unit 2 executes image processing with respect to the first image signal output from the main acquiring unit 3 to acquire the first acquired image data, and executes image processing with respect to the two second image signals output from the back face imaging unit 4 to acquire the two pieces of parallax image data. The image processing control unit 2 performs image processing with respect to the two pieces of parallax image data to clip image data of the second main subject. The image processing control unit 2 combines the first acquired image data with the clipped image data of the second main subject to create combined image data. The image processing control unit 2 has a temporary recording unit 21, a face detection unit 22, a figure clipping unit 23, a combination determining unit 24, and a combination unit 25.

The temporary recording unit 21 temporarily records the first acquired image data obtained by imaging of the main imaging unit 3 and the two pieces of parallax image data obtained by imaging of the back face imaging unit 4.

The face detection unit 22 detects a facial part of, e.g., a person as the first main subject from the first acquired image data. The face detection unit 22 detects arrangement of each part in a facial part of a person and the like e.g., an ocular part, a nasal part, or an oral part.

The figure clipping unit 23 clips image data of the second main subject from the two pieces of parallax image data.

Description will now be given as to clipping of image data of a facial part of the user himself/herself performed by the figure clipping unit 23.

FIG. 3 shows how a user H photographs himself/herself. The user H holds the camera main body 1 with, e.g., his/her right hand RH to photograph himself/herself. The camera main body 1 shows respective view angles 4a-g and 4b-g of the left and right (LR) imaging units 4a and 4b corresponding to the back face imaging unit 4.

Figure 4:
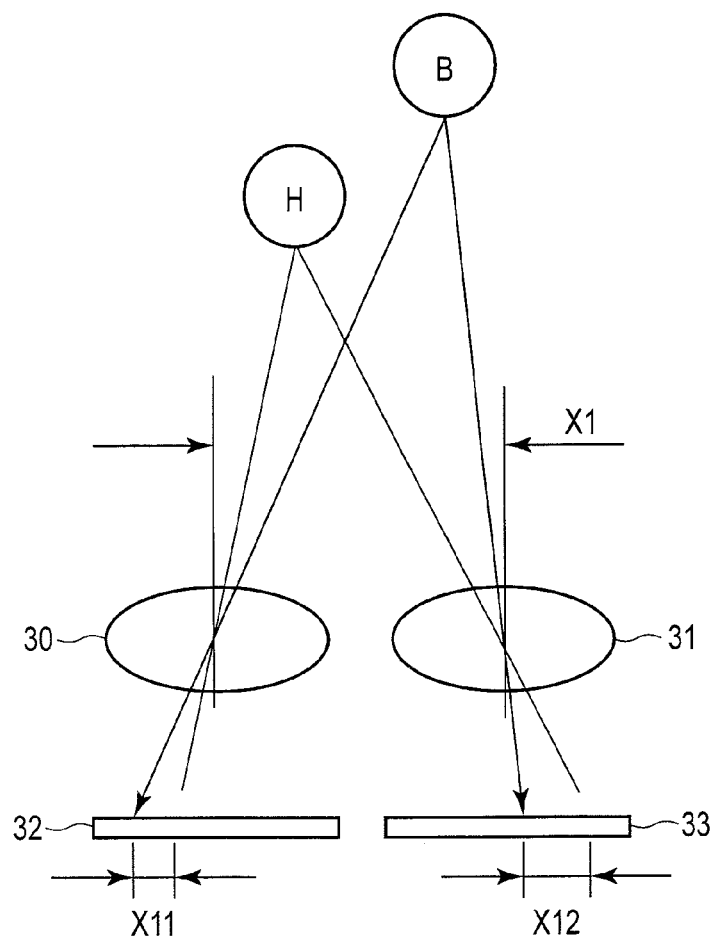
FIG. 4 is a schematic block diagram showing a back face imaging unit in the apparatus.

FIG. 4 is a schematic structural view of the back face imaging unit 4. The back face imaging unit 4 is a 3D camera as described above and includes two taking lenses 30 and 31 and two imaging elements 32 and 33. The taking lens 30 is associated with the imaging element 32, and the taking lens 31 is associated with the imaging element 33. Each of the taking lenses 30 and 31 is arranged to be apart from each other by an interval X1.

Each of two pieces of acquired image data K1 and K2 shown in FIG. 5 is parallax image data. Each parallax image data represents an image of the user H who performs, e.g., photography from respective positions of the taking lenses 30 and 31 apart from each other by the interval X1. The respective pieces of acquired image data K1 and K2 have a parallax corresponding to the interval X1 between the respective taking lenses 30 and 31. When the user H and a background B have a difference in distance, a relative position that respective images of the user H and the background B strike on each imaging element 32 or 33 through each taking lens 30 or 31 based on the triangulation principle differs. That is, a difference between respective incidence positions of the user H and the background B is X11 on one imaging element 32. A difference between respective incidence positions of the user H and the background B is X12 on the other imaging element 33. Each of the differences X11 and X12 is a parallax associated with the interval X1 between the taking lenses 30 and 31. The respective differences X11 and X12 are different from each other and meet a relationship of X11≠X12, Therefore, when the 3D back face imaging unit 4 is used to perform photography with the parallax, for example, such two pieces of acquired image data K1 and K2 as shown in FIG. 5 are obtained. As shown in the drawing, when the two pieces of acquired image data K1 and K2 are arranged while fitting positions of respective image data portions of a facial part of the user H to each other, the respective pieces of image data of the user H have a high degree of coincidence in the two pieces of acquired image data K1 and K2, but the respective pieces of image data of a background part have a low degree of coincidence. Therefore, when the image data having the high degree of coincidence is clipped from any one of the two pieces of acquired image data K1 and K2, image data L of the facial part of the user H alone can be clipped.

The image combination unit 25 combines the image data L of the facial part of the user H clipped by the figure clipping unit 23 with the first acquired image data obtained by imaging of the main imaging unit 3 under preset combining conditions.

The combination determining unit 24 judges whether the image data L of the facial part of the user H clipped by the figure clipping unit 23 can be combined with the first acquired image data based on, e.g., a picture composition of the first acquired image data including a family of the user H as the combining conditions for obtaining the first acquired image data.

The combination determining unit 24 makes as the combining conditions at least one of a judgment upon a position of a shaded portion, e.g., the facial part of the user H, a judgment upon presence/absence of a combination space for the facial part and the like of the user H based on a position of the family of the user H in the first acquired image data, a judgment upon acquisition of the facial part of the user H by imaging, and a judgment upon whether, e.g., a facial part of the family of the user H and the facial part of the user H have been imaged at the same height position.

The combination determining unit 24 makes as the combining conditions at least one of a judgment upon a picture composition of the first acquired image data including the first main subject such as a person, a judgment upon presence/absence of a combination space for the second main subject such as a person like the user in the first acquired image, and a judgment upon whether image data of the second main subject clipped by the figure clipping unit 23 can be combined with the first acquired image data.

The combination determining unit 24 makes a judgment upon presence/absence of the combination space for a space used for combination of the image data of the second main subject clipped by the figure clipping unit 23 based on a position of the first main subject detected by the face detection unit 22, and makes a judgment upon whether combination of the image data of the second main subject is possible based on a result of this judgment.

A judgment when the combination is inappropriate will now be described.

First, a first combination judgment will be described.

Figure 6:
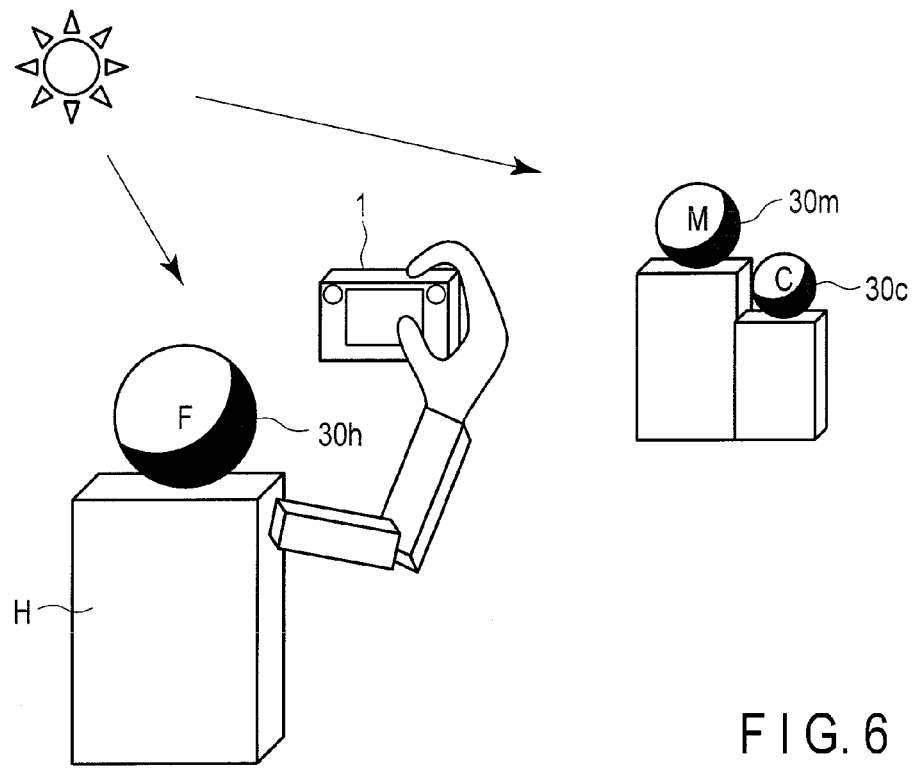
FIG. 6 is a view showing an example of an imaging situation for creating combined image data by the apparatus.

FIG. 6 shows an example of an imaging situation for creating combined image data. Here, the user H is a father F and a mother M and a child C form his family to make a usage scene understandable. In the following description, the user H will be referred to as a user F since he is the father F.

The user F holds the camera main body 1 and aims the main imaging unit 3 at the mother M and the child C to perform an imaging operation, thereby obtaining first acquired image data. At the same time, the user F aims the respective left and right (LR) imaging units 4a and 4b as the back face imaging unit 4 at the user F himself and performs the imaging operation to obtain two pieces of parallax image data, e.g., two pieces of acquired image data K1 and K2 shown in FIG. 5. As a photography situation at this moment, sunlight with high illuminance is applied from the sun. Respective shaded portions 30h, 30m, and 30c are formed at obliquely lower right portions of the facial parts of the user F, the mother M, and the child C in the drawing because of the application of sunlight.

Combined image data G1 is obtained by combining image data of the facial part of the user F clipped from each of the two pieces of acquired image data K1 and K2 with the first acquired image data including the mother M and the child C acquired by photography in the above-described photography situation.

Figure 7:
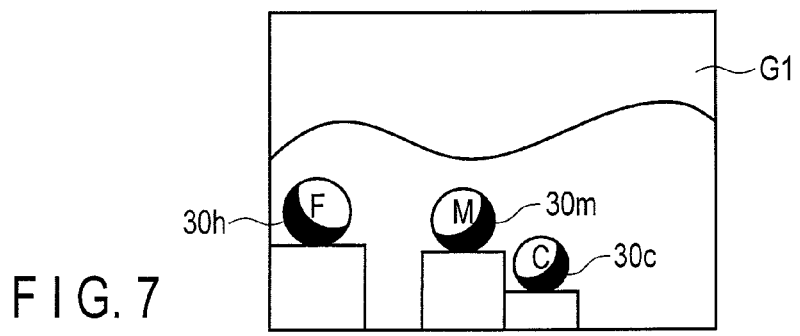
FIG. 7 is a schematic view showing an example of inversion of a shaded portion determined to be inappropriate for combination by the apparatus.

FIG. 7 is a schematic view of the combined image data G1. In the combined image data G1, positions of the respective shaded portions 30m and 30c of the mother M and the child C are opposite to a position of the shaded portion 30h of the user F. The respective shaded portions 30m and 30c of the mother M and the child C are formed at the obliquely lower right portions of the facial parts. However, the shaded portion 30h of the user F is inverted to be unnaturally formed at an obliquely lower left portion of the facial part.

Therefore, the combination determining unit 24 detects the positions of the respective shaded portions 30m and 30c of the mother M and the child C and the position of the shaded portion 30h of the user F in the combined image data G1 shown in FIG. 7, for example. The combination determining unit 24 compares the positions of the respective shaded portions 30m, 30c, and 30h with positions of the respective facial parts of the mother M, the child C, and the user F and judges whether the positions of the respective shaded portions 30m, 30c, and 30h are not inverted. When the inversion is found as a result of the judgment, the combination determining unit 24 determines that the combination is inappropriate.

The combination determining unit 24 detects each portion whose luminance is reduced to a predetermined luminance level or a lower level as compared with the surroundings as the shaded portion 30m, 30c, or 30h. The face detection unit 22 detects the positions of the respective facial parts of the mother M, the child C, and the user F. An inclination of shade can be determined by using, e.g., the face detection unit 22 to compare left and right brightness distributions of the face with each other.

A second combination judgment will now be described.

Figure 8:
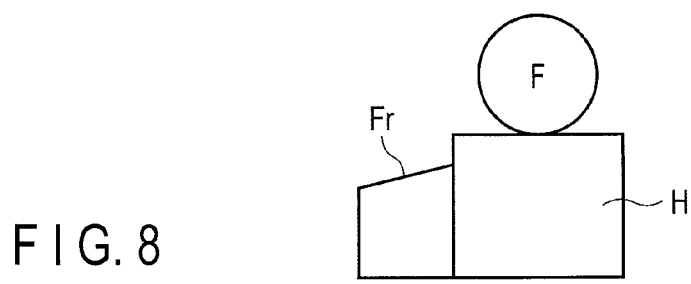
FIG. 8 is a schematic view showing image data of a facial part of the user clipped from two pieces of acquired image data obtained by the apparatus when a camera main body was held with a right hand for photography.

For example, as shown in FIG. 6, the user F holds the camera main body 1 with his right hand to perform a photography operation. Image data of the facial part of the user F clipped from the two pieces of the acquired image data K1 and K2 by this photography operation represents, e.g., an image of an upper body in which a right arm Fr is projected as shown in FIG. 8.

Figure 9:
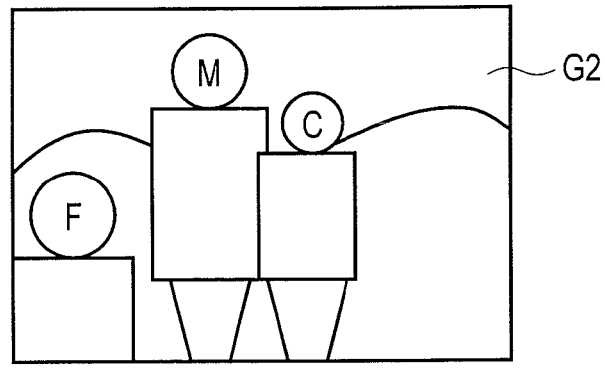
FIG. 9 is a schematic view showing image data which seems to be extremely unbalanced in regard to a mother and a child shown as full-length figures and the user whose face alone is shown in the apparatus.

On the other hand, when the first acquired image data is obtained by photographing full-length figures of the mother NM and the child C, such combined image data G2 as shown in FIG. 9 can be obtained by combining the image data of the facial part of the user F clipped from the two pieces of the acquired image data K1 and K2 with the first acquired image data. In the combined image data G2, the mother M and the child C as the full-length figures are combined with the user F showing the facial part alone. The combined image data G2 may possibly represent an image that the main subject is extremely unbalanced.

Therefore, for example, the combination determining unit 24 detects the respective positions of the facial parts of the mother M and the child C and the position of the facial part of the user F in the combined image data G2 shown in FIG. 9 and judges whether the respective positions of these facial parts are present at substantially the same height in the horizontal direction. When the positions of the respective facial parts are not present at substantially the same height, the combination determining unit 24 determines that the combination is inappropriate. The horizontal direction can be obtained from a result of detection of a posture of the camera main body 1 performed by the acceleration sensor 9.

A third combination judgment will now be described.

Figure 10:
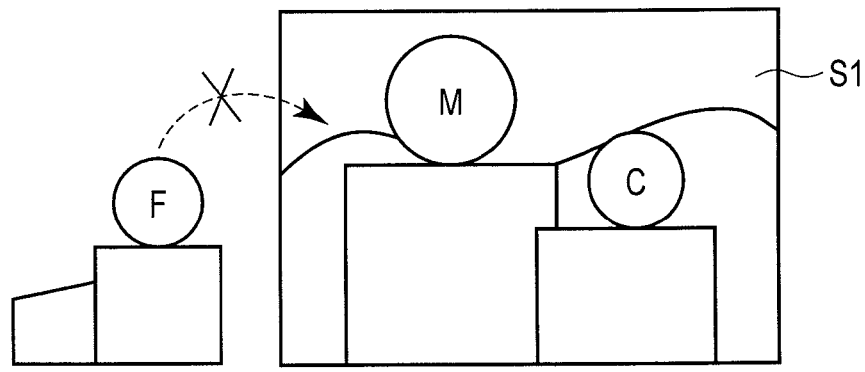
FIG. 10 is a schematic view for explaining a judgment upon whether there is a space for combining image data of the user's facial part with first acquired image data acquired by the apparatus.

FIG. 10 is a schematic view of an example of first acquired image data S1. In the first acquired image data S1, the most part of image data is occupied by the mother M and the child C. The first acquired image data does not have a space for combination of image data of the facial part of the user F.

Therefore, for example, the combination determining unit 24 calculates an occupancy ratio of image data of the mother M and the child C in the first acquired image data S1 shown in FIG. 10 to compute an area of the space for combination of the image data of the facial part of the user F. The combination determining unit 24 compares the area of the space with an area occupied by the image data of the facial part of the user F and judges whether the space for combination of the image data of the facial part of the user F is present in the first acquired image data S1. If the space is not present as a result of this judgment, the combination determining unit 24 determines that the combination is inappropriate.

A judgment when the image combination is appropriate will now be specifically explained with reference to FIG. 11 to FIG. 13.

Figure 11:
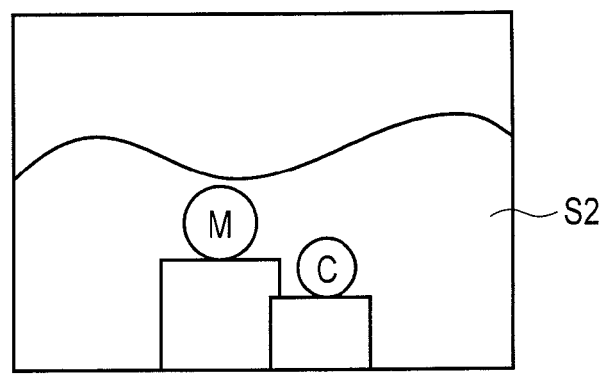
FIG. 11 is a view for explaining a judgment upon whether image combination in the apparatus is appropriate.

As shown in FIG. 11, for example, as first acquired image data S2 of the mother M and the child C acquired by imaging of the main imaging unit 3, it is preferable to photograph respective upper bodies of the mother M and the child C to obtain this image data S2 like the image data of the facial part of the user F obtained by imaging of the back face imaging unit 4. The upper body of each of the mother M and the child C is approximately triple a height of each facial part.

Figure 12:
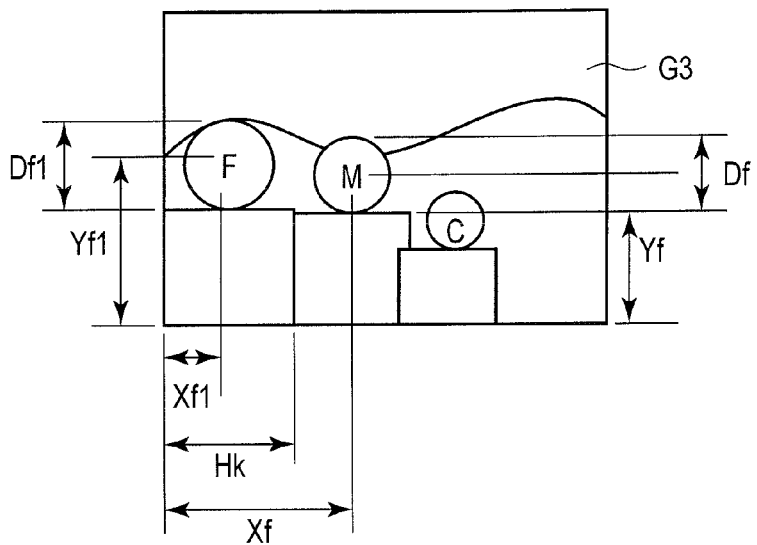
FIG. 12 is a view for explaining a judgment upon whether the image combination in the apparatus is appropriate.

Therefore, as shown in FIG. 12, a distance Yf, which is a distance from a central portion of the facial part of the motor M to a lower end of the image data, is allowed to the extent of the following level:

$$Yf \leq 2.5Df \quad (1)$$

As shown in FIG. 12, combined image data G3 requires a width space for combination of image data corresponding to a shoulder width Hk of the user F. If the shoulder width Hk of the user F is approximately double a height Df of the facial part of the mother M, a width space represented by the following expression or a larger space is required on, e.g., the left side of the mother M:

$$Hf \approx 2 \times Df \quad (2)$$

To meet this necessary condition, the following condition is required:

$$Xf > 3 \times Df \quad (3)$$

Xf indicates a distance between, e.g., a left end of the image data and a central portion of the facial part of the mother M.

Therefore, the face detection unit 22 detects a position of the central portion of the facial part of the mother M.

The combination determining unit 24 receives information indicative of the position of the central portion of the facial part of the motor M detected by the face detection unit 22, obtains the distance Xf between the central portion of the facial part of the mother M and the left end of the first acquired image data S2, and also obtains the height (a length) Df of the facial part of the mother M.

The combination determining unit 24 judges whether the condition of Expression (3) is met. When the condition of Expression (3) is met, the combination determining unit 24 determines that the space for combination of the image data of the facial part of the user F is present in the first acquired image data S1.

Figure 13:
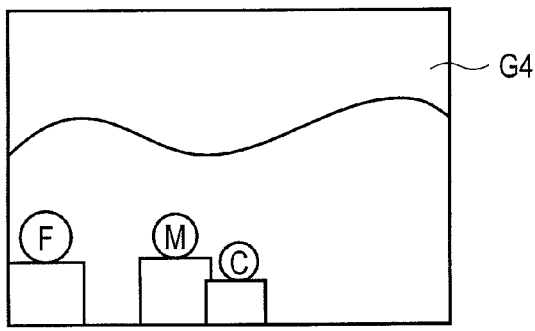
FIG. 13 is a view for explaining a judgment upon whether the image combination in the apparatus is appropriate.

FIG. 13 shows combined image data G4 obtained by combining the image of the user F with an image of the child C. Images of the mother M and the child C in the combined image data G4 are shown smaller than, e.g., the images of the mother M and the child C depicted in FIG. 11.

To create the combined image data G, the combination determining unit 24 judges whether the space for combination of the image data of the facial part of the user F is present in, e.g., the first acquired image data before the combination of the image data facial part of the user F. When the space is determined to be present, the combination determining unit 24 reduces a size of the image data of the facial part of the user F and combines the reduced image data with the first acquired image data in accordance with sizes of the images of the mother M and the child C.

Figure 14:
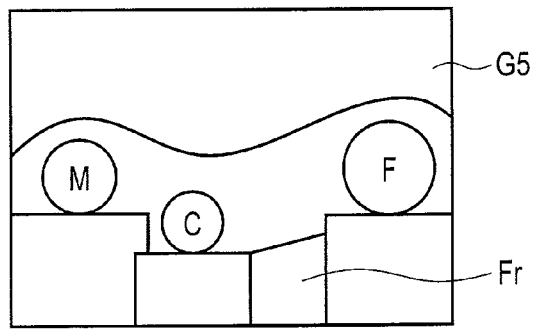
FIG. 14 is a view showing combined image data obtained by combining the user's image with an image of the mother and the child acquired by the apparatus.

FIG. 14 shows combined image data G5 obtained by combining the images of the mother M and child C with the image of the user F. The user F in the combined image data G5 is shown in such a manner that his right hand Fr holding the camera main body 1 is unnatural. In such a case, the image combination unit 25 executes image processing to remove the right hand Fr of the user F from the picture composition like combined image data G6 shown in FIG. 15 and hide the right hand Fr. As a result, unnaturalness of the right hand Fr of the user F can be eliminated.

In this case, a height Df1 of the facial part of the user F is set to be equal to the height Df of the facial part of the mother M (Df1=Df). Further, a distance Xf1 between, e.g., the left end of the image data and a central portion of the facial part of the user F is set to be equal to the height Df1 of the facial part of the user F (Xf1=Df1). A distance Yf between, e.g., a lower end of the image data and the central portion of the facial part of the user F is set to be equal to a distance Yf1 between, e.g., the lower end of the image data and the central portion of the facial part of the mother M (Yf=Yf1). As a result, unnaturalness can be eliminated.

Furthermore, these relationships Df1=Df, Xf1=Df1, and Yf1=Yf are slightly increased on the assumption that the user F performs photography. The unnaturalness of the right hand Fr of the user F can be assuredly eliminated by slightly increasing these relationships Df1=Df, Xf1=Df1, and Yf1=Yf, e.g., multiplying these relationships by 1.1, namely, attaining the following expressions:

$$Df1=1.1 \times Df$$

$$Xf1=1.1 \times Df1$$

$$Yf1=1.1 \times Yf$$

In this case, it is assumed that images of the mother M and the child D are obtained by shooting shoulder parts to the facial parts of the mother M and the child C.

Therefore, the combination determining unit 24 executes image processing with respect to the combined image data G5 depicted in FIG. 14 to achieve the following relationship:

$$Df1=1.1 \times Df$$

$$Xf1=1.1 \times Df1$$

$$Yf1=1.1 \times Yf$$

In the combined image data G6 depicted in FIG. 15, if the distance Yf between, e.g., the lower end of the image data and the central portion of the facial part of the user F is equal to the height (the length) Df1 of the facial part of the user F (Yf=Df1), the right hand Fr of the user F is removed from the picture composition of the image, and the unnaturalness of the right hand Fr of the user F can be eliminated.

Even in case of the combined image data G5 in which the right hand Fr of the user F is unnatural as shown in FIG. 14, it is possible to obtain combined image data in which the unnaturalness of the right hand Fr of the user F is eliminated by clipping an image data portion G5a representing a picture configuration where the right hand Fr of the user F is shown as an image from the combined image data G5 as shown in FIG. 16.

An inclination of the camera main body 1 for creating combined image data will now be described with reference to FIG. 17 to FIG. 19.

FIG. 17 shows an optimum inclined state of the camera main body 1 at the time of photography. It is appropriate to arrange a photography optical axis Q of the camera main body 1 on a straight line with respect to the user F, the mother M, and the child C so that the user F can face the mother M, and the child C through the camera main body 1. As the best photography situation, the camera main body 1 is not inclined, the user F, the mother M, and the child C are arranged at substantially the same height positions, and the photography optical axis Q of the camera main body 1 is horizontally arranged. Whether the photography optical axis Q of the camera main body 1 is horizontally arranged can be judged by using the image processing control unit 2 to obtain an inclination of the camera main body 1 from an orientation signal output from the acceleration sensor 9.

On the other hand, FIG. 18 shows an example of an inappropriate inclined state of the camera main body 1 at the time of photography. The photography optical axis Q of the camera main body 1 is horizontally arranged. On the other hand, the user F and the child C have different heights. For example, when a height position of the camera main body 1 is conformed to the child C, the camera main body 1 can image the facial part of the child C by the main imaging unit 3. However, the back face imaging unit 4 images a chest part of the user F. Therefore, the facial part of the user F cannot be imaged, which is unnatural.

Therefore, the combination determining unit 24 detects a difference between acquired image data of the facial part of the child C obtained by imaging of the main imaging unit 3 and image data of the chest part of the user F obtained by imaging of the back face imaging unit to determine that combination is inappropriate.

FIG. 19 shows another example of an inappropriate inclined state of the camera main body 1 at the time of photography. The photography optical axis Q of the camera main body 1 is arranged to be inclined with respect to the horizon. An inclination θ of the camera main body 1 is formed to connect the respective facial parts of the user F and the child C having a difference in height with each other on a straight line. In this case, for example, the ground is imaged in image data of the facial part of the child C obtained by imaging of the main imaging unit 3. Therefore, when combined image data is created, the facial part of the user F may be arranged on, e.g., the ground, which is unnatural.

Therefore, the combination determining unit 24 obtains the inclination θ of the camera main body 1 from an orientation signal output from the acceleration sensor 9 and determines that the combination is inappropriate if the camera main body 1 has the inclination θ.

If the image data of the facial part of the user F clipped by the figure clipping unit 23 cannot be combined with the first acquired image data as a result of the judgment of the combination determining unit 24, information indicating that the combination is impossible, e.g., information indicating that the combination of the image data of the facial part of the user F is impossible is displayed in, e.g., the display unit 7.

The image processing control unit 2 judges whether the combination of the image data of the facial part of the user F clipped by the figure clipping unit 23 is possible based on positions of the mother M and the child C detected by the face detection unit 22.

The image processing control unit 2 obtains a posture of the camera main body 1, e.g., the inclination θ of the camera main body 1 from an orientation signal output from the acceleration sensor 9. The image processing control unit 2 judges whether the mother M, the child C, and the user F are imaged at the same height position based on the inclination θ of the camera main body 1.

When the combination is determined to be possible as a result of the judgment made by the combination determining unit 24, the combination unit 25 combines the imaged data of the facial part of the user F clipped by the figure clipping unit 23 with the first acquired image data recorded in the temporary recording unit 21.

The image processing control unit 2 expands or contracts the image data of the facial part of the user F clipped by the figure clipping unit 23 to be combined with the first acquired image data.

The image processing control unit 2 can slidably move the image data of the facial part of the user F clipped by the figure clipping unit 23 into the first acquired image data.

Figure 20:
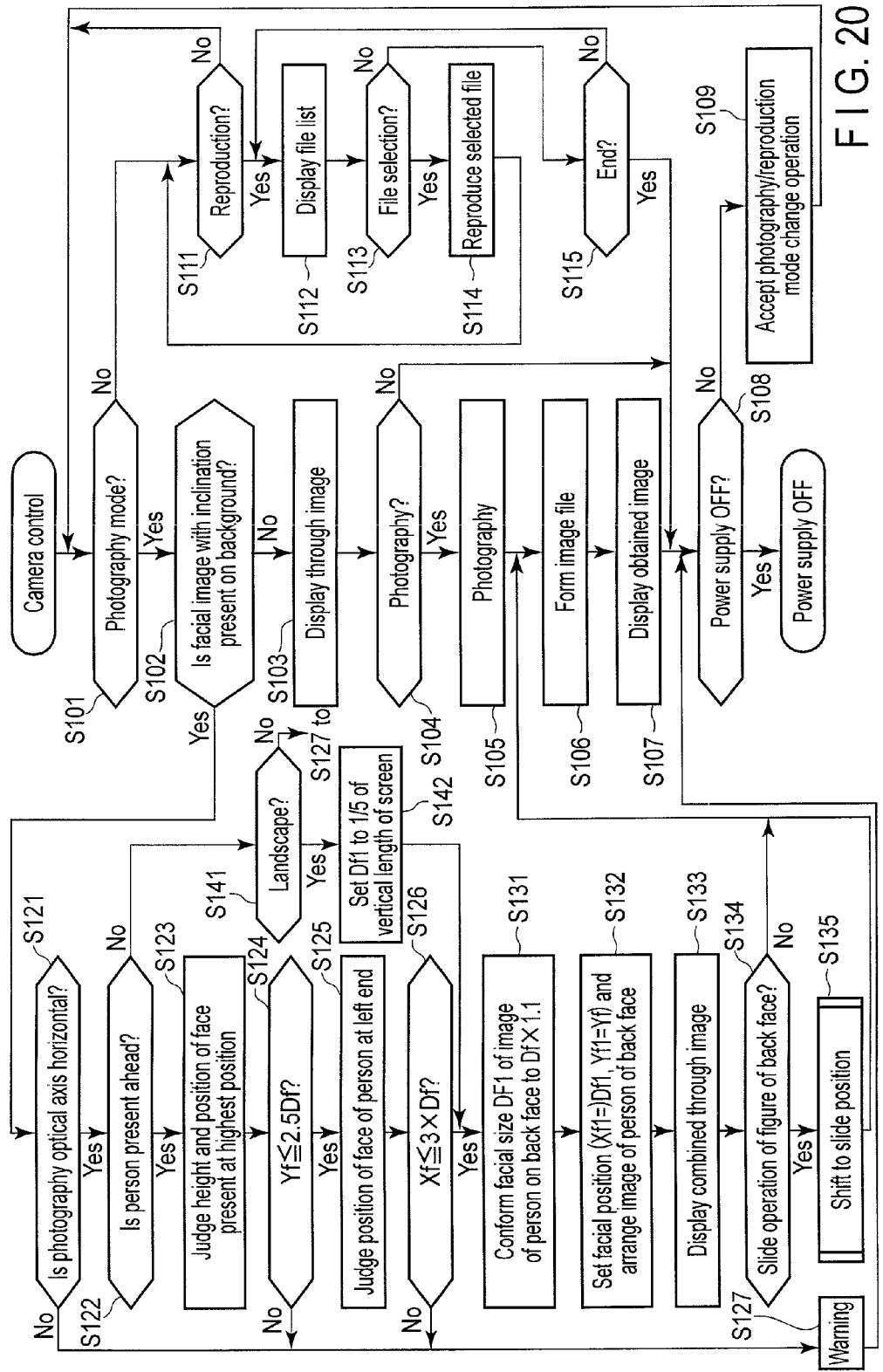
FIG. 20 is a camera control flowchart including image combination in the apparatus.

Camera control including image combination using the camera will now be described with reference to a camera control flowchart depicted in FIG. 20.

An operation mode of the camera main body 1 is set by an operation of the operation unit 5 effected by the user. At a step S101, the image processing control unit 2 reads various kinds of buttons on the operation unit 5 for user operations and judges whether the operation mode is a photography mode. If the operation mode is the photography mode as a result of this judgment, the image processing control unit 2 judges whether an image of the facial part of the user F is present in, e.g., two pieces of parallax image data obtained by imaging of the back face imaging unit (the respective L and R imaging units 4a and 4b) provided on the back face of the camera main body 1.

If the image of the facial part of the user F is not present in, e.g., the two pieces of parallax image data as a result of this judgment, the combination determining unit 24 determines that image data of the facial part of the user F clipped by the figure clipping unit 23 can be combined with the first acquired image data obtained by imaging of the main imaging unit 3.

At a step S103, the image processing control unit 2 executes image processing with respect to an image signal output from the main imaging unit 3 and displays a processed signal as a through image in the display unit 7.

At a step S104, the image processing control unit 2 judges whether a photography start instruction has been issued in response to an operation of the operation unit 5 by the user. When the photograph start instruction has been issued as a result of this judgment, the image processing control unit 2 executes still picture shooting for obtaining still image data by operating the imaging unit 2 in case of, e.g., shooting of a still image at a step S105. In case of shooting of a moving picture, the image processing control unit 2 executes moving picture shooting for obtaining moving image data by continuously operating the main imaging unit 3.

After end of the still picture shooting or the moving picture shooting, the image processing control unit 2 creates a still picture or moving picture image file and records the created image file in the recording unit 6 at a step S106. After the creation of the image file, the image processing control unit 2 displays the still picture or moving picture data in the display unit 7.

At a step S108, the image processing control unit 2 then judges whether a power supply OFF instruction has been issued in response to an operation of the operation unit 5 effected by the user. If the power supply OFF instruction has been issued, the image processing control unit 2 terminates the camera control. If the power supply OFF instruction has not been issued, the image processing control unit 2 returns to the step S101.

If the operation mode of the camera 1 is not the photography mode, the image processing control unit 2 advances to a step S111 from the step S101 to judge whether the operation mode is a reproduction mode. If the operation mode is the reproduction mode as a result of this judgment, the image processing control unit 2 lists (thumbnails) in the display unit 7 respective files of still pictures and moving pictures recorded in the recording unit 6. When any one of the respective files of still pictures and moving pictures is touched and selected on the display unit 7 by the user, the touch panel 8 outputs a touch position signal associated with a touch position at a step S113.

At a step S114, the image processing control unit 2 reproduces in the display unit 7 the still picture or the moving picture selected by touch from the respective files of still pictures and moving pictures listed in the display unit 7 from the touch position signal from the touch panel 8.

If no file of still pictures and moving pictures is selected by touch of the user, the image processing control unit 2 terminates the reproduction mode at a step S115 and judges whether the power supply OFF instruction has been issued at the next step S108. If the power supply OFF instruction has not been issued, the image processing control unit 2 again accepts a change operation for the photography mode or the reproduction mode and returns to the step S101.

On the other hand, at the step S102, if the image of the facial part of the user F is present in the two pieces of parallax image data obtained by imaging of the back face imaging unit (the respective LR imaging units 4a and 4b) provided on the back face of the camera main body 1, the image processing control unit 2 advances to a step S121. At the step S121, the image processing control unit 2 obtains a posture of the camera main body 1, e.g., the inclination θ of the camera main body 1 from an orientation signal output from the acceleration sensor 9 and also judges whether the inclination of the camera main body 1 is horizontal.

As a result of this judgment, if the image of the facial part of the user F is present in the two pieces of parallax image data, the inclination θ of the camera main body 1 is horizontal, the camera main body 1 is in an optimum inclined state at the time of shooting as shown in, e.g., FIG. 17, namely, the camera main body 1 is not inclined, the user F, the mother M, and the child C are present at substantially the same heights, and the photography optical axis Q of the camera main body 1 is horizontally arranged, the image processing control unit 2 judges whether a person is present in front of the camera main body 1, i.e., in the first acquired image data, e.g., first acquired image data S2 shown in FIG. 11 obtained by imaging of the main imaging unit 3. Here, the mother M and the child C are determined to be present.

If the inclination of the camera main body 1 is not horizontal, the image processing control unit 2 advances to a step S127, and displays a warning that the inclination of the camera main body 1 is not horizontal in, e.g., the display unit 7, or gives this warning using sound.

When the mother M and the child C are present in this manner, the image processing control unit 2 determines a height position of the highest facial part in the first acquired image data S2. Here, the face detection unit 22 detects the respective facial parts of the mother M and the child C from the first acquired image data S1. The image processing control unit 2 obtains heights and positions of the respective facial parts of the mother M and the child C detected by the face detection unit 22 and determines the facial part present at the highest position in the first acquired image data, which is the height and the position of the mother M in this example, from the obtained heights and positions of these facial parts.

At a step S124, assuming that Yf is a distance from the central portion of the facial part of the mother M to the lower end of the image data and Df is the height (a length) of the facial part of the mother M, the image processing control unit 2 judges whether the distance Yf meets Yf≤2.5Df in Expression (1).

If Expression (1) is met as a result of this judgment, the image processing control unit 2 determines a person who is present at the left end in the first acquired image data S2 shown in FIG. 11, which is the position of the facial part of the mother M in this example, at a step S125. The position of the facial part of the mother M has been already detected by the face detection unit 22.

At a step S126, the image processing control unit 2 judges whether Xf>3×Df in Expression (3) is met since a width space for combination of image data of the shoulder width Hk of the user F is required in the combined image data G3 as shown in FIG. 12.

As a result of this judgment, if Expression (3) is met, the image processing control unit 2 instructs the figure clipping unit 23 to clip the image data of the facial part of the user F at a step S131. The figure clipping unit 23 clips the image data of the facial part of the user F from the two pieces of parallax image data obtained by imaging of the back face imaging unit (the respective LR imaging units 4a and 4b). The image combination unit 25 combines the image data of the facial part of the user H clipped by the figure clipping unit 23 with the first acquired image data obtained by imaging of the main imaging unit 3.

The image processing control unit 2 conforms the height (the length) Df1 of the facial part of the user F from the clipped image data of the facial part of the user F to 1.1-fold of the height (the length) Df of the facial part of the mother M, i.e., the following expression:

$$Df1 = 1.1 \times Df$$

At a step S132, the image processing control unit 2 sets the height (the length) Df1 of the facial part of the user F to be equal to the height (the length) Df of the facial part of the mother M (Df1=Df) like combined image data G6 shown in FIG. 15, for example. Further, the image processing control unit 2 sets the distance Xf1 between, e.g., the left end and the central portion of the facial part of the user F in the image data to be equal to the height (the length) Df1 of the facial part of the user F (Xf1=Df1). The image processing control unit 2 sets the distance Yf between, e.g., the lower end and the central portion of the facial part of the user F in the image data to be equal to the distance Yf1 between, e.g., the lower end and the central portion of the facial part of the mother M (Yf=Yf1). As a result, as shown in FIG. 12 or FIG. 15, the combined image data G3 in which the unnaturalness of the right hand Fr of the user F is eliminated can be obtained by performing the image processing to remove the image of the right hand Fr of the user F and hide the right hand Fr.

At a step S133, the image processing control unit 2 executes the image processing with respect to the combined image data G3 depicted in FIG. 12 or FIG. 13 and displays an obtained result as a through image in the display unit 7.

At a step S134, the image processing control unit 2 receives a touch position signal obtained when the user F performs a touch operation on the touch panel 8 and judges whether the image of the user F is to be moved in a sliding manner in combined image data G7 shown in, e.g., FIG. 22 based on this touch position signal.

FIG. 21 shows a control flowchart of the slide movement. As shown in FIG. 22, the user F touches the image of the user F which is to be moved in the sliding manner on the screen of the display unit 7. The touch panel 8 outputs the touch position signal associated with this touch position in response to the touch of the user.

At a step S201, the image processing control unit 2 obtains the touched position in the image on the display unit 7 from the touch position signal from the touch panel 8 and judges whether this touch position is associated with the image of the facial part of the user F.

If the touch position is associated with the image of the facial part of the user F as a result of this judgment, the image processing control unit 2 traces the slide movement of the touch position from the touch position signal output from the touch panel 8 at a step S202. That is, the user F moves the touch position to a desired position as depicted in, e.g., FIG. 23. The image processing control unit 2 moves the image of the user F on the image of the combined image data G3 in accordance with the slide movement of the touch position.

After the slide movement of the image of the user F, the image processing control unit 2 judges whether the condition Xf>3×Df represented by Expression (3) is met to determine whether a width space for combination of the image data of the user F is present at a step S202.

If the condition Xf>3×Df is met as a result of this judgment, the image processing control unit 2 combines the image data of the user F with the image of the combined image data G3 at a position after the slide movement and then advances to the step S104.

If the condition Xf>3×Df is not met, the image processing control unit 2 advances to a step S203 and judges whether the distance Yf between, e.g., the lower end and the central portion of the facial part of the user F in the image data is smaller than the height (the length) Df1 of the facial part of the user F (Yf≤Df1) in the combined image data G6 as shown in, e.g., FIG. 15. If Yf≤Df1 is met as a result of this judgment, the image processing control unit 2 combines the image data of the user F with the image of the combined image data G3 at the position after the slide movement at the step S202. If Yf≤Df1 is not met, the image processing control unit 2 displays a warning indicating that the combination is impossible in the display unit 7 or gives the warning using sound at a step S205, for example.

FIG. 24 is a block diagram showing functions of the camera main body 1 in a simplified manner. The camera main body 1 has the image processing control unit 2, the main imaging unit 3, the back face imaging unit 4, the operation unit 5, the display unit 7, the figure clipping unit 23, and the combination unit 25. The image processing control unit 2 decides a combining position of the image data of the facial part of the user F in the first acquired image data.

The back face imaging unit 4 may not include the two imaging elements 32 and 33 and the like for the 3D camera, and it may include one imaging element. In case of the camera main body 1 including one imaging element, it is sufficient to acquire two pieces of parallax image data having a parallax at different timings as will be described later.

As explained above, according to the first embodiment, the main imaging unit 3 is used to obtain the first acquired image data formed by shooting, e.g., the family of the user F, the back face imaging unit 4 is used to obtain the two pieces of parallax image data having the parallax formed by shooting, e.g., the user F, the image data of the facial part of the user F is clipped from the two pieces of parallax image data, and the clipped image data of the facial part of the user F is combined with the first acquired image data obtained by shooting the family of the user F under the preset combining conditions.

As the combining conditions, there are, e.g., a picture composition of the first acquired image data including the family of the user F, a position of a shaded portion on the facial part and the like of the user F, presence/absence of the combination space for the facial part and the like of the user F based on, e.g., a position of the family of the user F in the first acquired image data, whether the facial part of the user F has been imaged and acquired, whether a facial part of the family of the user F and the facial part of the user F have been imaged at the same height position, and others.

As a result, when viewing a combined picture of an image, for example, it is possible to obtain the combined picture giving an impression that the user F is fitted in the family (the mother M or the child C) or a landscape without unnaturally combining the user F with his family (the mother M or the child C) or the landscape and to leave an impression of a natural picture composition in terms of arrangement positions of the user and the family and others.

Specifically, it is possible to determine that the combination is inappropriate.

Firstly, the combination determining unit 24 compares positions of the respective shaded portions 30$m$ and 30$c$ of the mother m and the child c with a position of the shaded portion 30$h$ of the user F in the combined image data G1 shown in FIG. 7, for example. If the positions of the respective shaded portions 30$m$, 30$c$, and 30$h$ are inverted, the combination determining unit 24 determines that the combination is inappropriate.

Secondly, the combination determining unit 24 judges whether respective positions of the facial parts of the mother M and the child C and a position of the facial part of the user F are present at substantially the same heights in the horizontal direction in the combined image data G2 depicted in FIG. 9, for example. If these positions are not present at substantially the same heights as a result of this judgment, the combination determining unit 24 determines that the combination is inappropriate.

Thirdly, the combination determining unit 24 compares, e.g., a region of the space for combination of the image data of the facial part of the user F with a region of the facial part of the user F in the first acquired image data S1 depicted in FIG. 10 and judges whether the space for combination of the image data of the facial part of the user F is present in the first acquired image data S1, for example. If the space is not present as a result of this judgment, the combination determining unit 24 determines that the combination is inappropriate.

Subsequently, a judgment when the combination is appropriate can be made.

The combination determining unit 24 obtains the distance Xf between the central portion of the facial part of the mother M and the left end of the first acquired image data, obtains the height (the length) Df of the facial part of the mother M, and determines that the space for combination of the image data of the facial part of the user F is present in the first acquired image data S1 if the condition (Xf>3×Df) of Expression (3) is met, thereby enabling the combination of the image data of the facial part of the user F.

In regard to, e.g., the unnatural right hand Fr of the user F holding the camera main body 1, the unnaturalness of the right hand Fr of the user F can be eliminated by executing the image processing to hide the right hand Fr. In this case, the unnaturalness of the right hand Fr of the user F can be assuredly eliminated by setting relationships between the height Df1 of the facial part of the user F, the height (the length) Df of the facial part of the mother M, the distance Xf1 between, e.g., the left end and the central portion of the facial part of the user F in the image data, the height (the length) Df1 of the facial part of the user F, the distance Yf between, e.g., the lower end and the central portion of the facial part of the user F in the image data, and the distance Yf1 between, e.g., the lower end and the central portion of the facial part of the mother M in the image data to Df1=1.1×Df, Xf1=1.1×Df1, and Yf1=1.1Yf.

Subsequently, an appropriate inclined state of the camera main body 1 can be judged. That is, the best photography situation is that the photography optical axis Q of the camera main body 1 is arranged on the straight line with respect to the user F, the mother M, and the child C and the user F is arranged to face the mother M and the child C through the camera main body 1.

Therefore, the image processing control unit 2 obtains the inclination $\theta$ of the camera main body 1 from the orientation signal output from the acceleration sensor 9, and it can determine that the combination is inappropriate when the camera main body 1 has the inclination $\theta$.

A second embodiment according to the present invention will now be described with reference to the drawings.

FIG. 25 is a block diagram of an imaging apparatus. FIG. 26A is a front outside drawing of the apparatus. FIG. 26B is a back outside drawing of this apparatus. It is to be noted that like reference numerals denote parts equal to those in FIG. 1, FIG. 2A, and FIG. 2B to omit detailed description thereof.

A back face imaging unit 30 is a two-dimensional camera. The back face imaging unit 30 acquires an optical image from a subject including a second main subject such as a person and outputs a second image signal like a main imaging unit 3. The back face imaging unit 30 images, e.g., a user F himself/herself who performs photography. The back face imaging unit 30 comprises a lens optical system including a focus lens, a diaphragm, a shutter, and an imaging element. The imaging element converts the optical image transmitted from the subjected through the lens optical system, the diaphragm, and the shutter into an image signal.

A display unit 31 includes, e.g., a liquid crystal display. The display unit 31 displays acquired image data obtained at the time of photography in the liquid crystal display. The display unit 31 reproduces and displays the recorded acquired image data in the liquid crystal display. A touch panel 8 is provided on an upper surface of the liquid crystal display. The display unit 31 can display a three-dimensional (3D) image by displaying respective pieces of left and right (LR) image data having a parallax in the liquid crystal display at the same time.

A guidance operation button 32 is a user operation button used for displaying on the liquid crystal display of, e.g., a display 6 a guidance showing a written operation method when combining first acquired image data obtained by imaging of the main imaging unit 3 with second acquired image data obtained by imaging of the back face imaging unit 30. The guidance of the operation method includes, e.g., "please move the camera main body sideways and do shooting again". The guidance "please move the camera main body sideways and do shooting again" of the operation method is displayed in the liquid crystal display of the display 6 when performing imaging by the back face imaging unit 30. The guidance "please move the camera main body sideways and do shooting again" may be given by sound from a sound device such as a speaker.

Camera control including image combination using the camera will now be described.

An image processing control unit 2 reads various kinds of buttons for user operations with respect to an operation unit 5 and judges whether an image combination mode is set. When the image combination mode is set, the image processing control unit 2 simultaneously executes imaging with the main imaging unit 3 and the back face imaging unit 30. When a release button is pressed at, e.g., timing T1 as shown in FIG. 27, the main imaging unit 3 and the back face imaging unit 30 simultaneously execute imaging at the time of this pressing operation. The main imaging unit 3 images, e.g., a mother M and a child C whose are family members of a user F. At the same time, the back face imaging unit 30 images, e.g., a facial part of the user F.

When the simultaneous imaging of the main imaging unit 3 and the back face imaging unit 30 is terminated and a guidance operation button 32 is pressed, the image processing control unit 2 displays, e.g., the guidance "please move the camera main body sideways and do shooting again" in the liquid crystal display of the display 6. The user F horizontally moves a camera main body 1 in, e.g., a direction of an arrow N as shown in FIG. 28. When the horizontal movement is terminated and the release button is pressed at timing T2 after the timing T1, the main imaging unit 3 and the back face imaging unit 30 simultaneously carry out imaging at the time of this pressing operation. The main imaging unit 3 images, e.g., the mother M and the child C who are the family members of the user F. At the same time, the back face imaging unit 30 images, e.g., the facial part of the user F.

Figure 29:
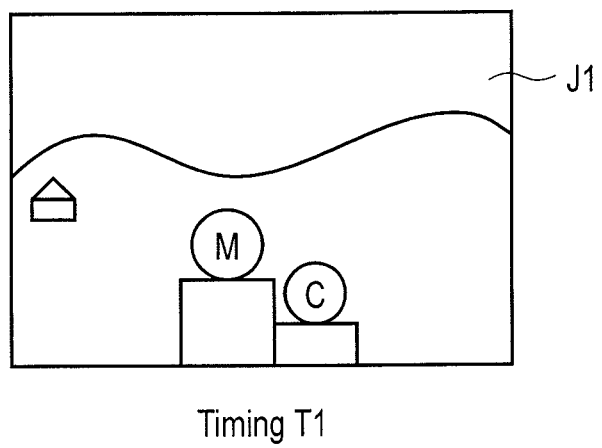
FIG. 29 is a view showing first acquired image data acquired by imaging using the main imaging unit in the apparatus at timing T1.
Figure 30:
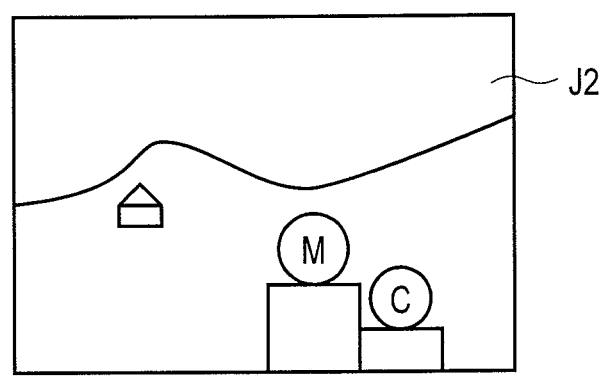
FIG. 30 is a view showing first acquired image data acquired by imaging using the main imaging unit in the apparatus at timing T2.

Respective pieces of acquired image data obtained by imaging of the main imaging unit 3 at the respective timings T1 and T2 have a parallax. This parallax is associated with an interval between respective imaging positions of the main imaging unit 3 at the respective timings T1 and T2. FIG. 29 shows first acquired image data J1 obtained by imaging at the timing T1. FIG. 30 shows first acquired image data J2 obtained by imaging at the timing T2. In the respective pieces of acquired image data J1 and J2, positions of the mother M and the child C are different in images.

Respective pieces of second acquired image data obtained by imaging by the back face imaging unit 30 at the respective timings T1 and T2 likewise have a parallax associated with an interval between the respective imaging positions of the back face imaging unit 30 at the timings T1 and T2.

The image processing control unit 2 clips pieces of image data of the mother M and the child C from the respective pieces of first acquired image data J1 and J2 obtained by imaging of the main imaging unit 3 at the timings T1 and T2. Further, the image processing control unit 2 clips pieces of image data of the facial part of the user F from the respective pieces of first acquired image data obtained by imaging by the back face imaging unit 30 at the respective timings T1 and T2.

Since the image data of the mother M and the child C and the image data of the facial part of the user F are clipped, these pieces of image data can be separated from, e.g., the first acquired image data J1 and are movable on the first acquired image data J1.

Figure 31:
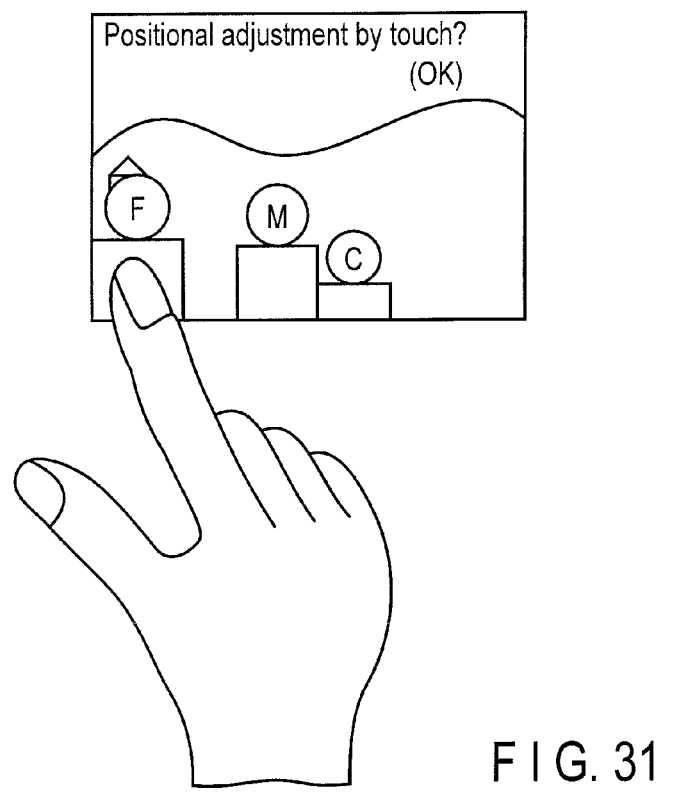
FIG. 31 is a view showing an operation of slide movement of a user' image in the apparatus.
Figure 32:
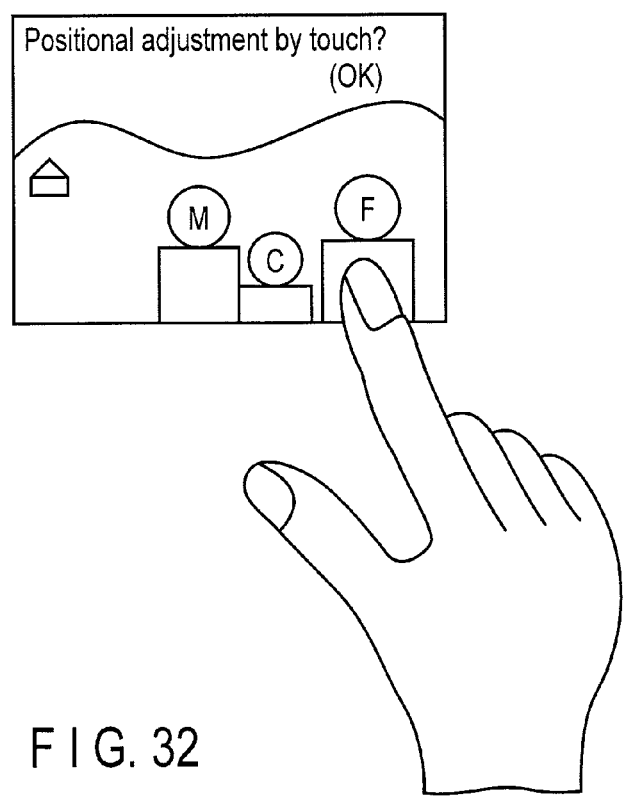
FIG. 32 is a view showing the slide movement of the user's image in the apparatus.

Therefore, the image processing control unit 2 moves the image data of the user F on the first acquired image data J1 in a sliding manner in accordance with a control flowchart of slide movement depicted in FIG. 21. Specifically, the user F touches the image of the user F that is to be moved in the sliding manner in a liquid crystal display screen of a display unit 7 as shown in FIG. 31. The user F moves a touch position to a desired position in the sliding manner as shown in, e.g., FIG. 32.

At the time of this slide movement, the image processing control unit 2 judges whether a condition $Xf>3\times Df$ represented by Expression (3) is met to determine whether a width space for combination of the image data of the user F is present. If the condition $Xf>3\times Df$ is met as a result of this judgment, the image processing control unit 2 combines the image data of the user F with the image of the combined image data G3 at a position after the slide movement.

As described above, according to the second embodiment, the back face imaging unit 30 is used as a two-dimensional camera, the camera main body 1 is moved sideways, and imaging is carried out at the respective different timings T1 and T2. The main imaging unit 3 and the back face imaging unit 30 can obtain the two pieces of first and second acquired image data having the parallax, and the image data of the facial part of the user F and the image data of the mother M and the child C can be clipped from the pieces of first and second acquired image data. As a result, the clipped image data of the facial part of the user F can be combined with the first acquired image data obtained by imaging the family members of the user F under the preset combining conditions. Consequently, according to the second embodiment, the same effect as that of the first embodiment can be exercised.

Since the image data of the facial part of the user F and the image data of the mother M and the child C can be clipped, for example, it is possible to execute combination that image data of an arm part of the user F is hidden behind the image data of the mother M and the child C or combination that the image data of the user F is aligned behind the mother M and the child C.

Although the above has described the combination that the background is removed from the second image, a person separated from the background may be slimmed, subjected to a makeup, or formed as an avatar to be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   a first imaging unit which is provided on a front face of an apparatus main body and images a first main subject to obtain first acquired image data;
   a second imaging unit which is provided on a back face of the apparatus main body and images a second main subject to obtain second acquired image data;

a clipping unit which clips image data of the second main subject from the second acquired image data obtained by imaging of the second imaging unit; and an image processing control unit which combines the first acquired image data with the image data of the second main subject clipped by the clipping unit to meet combining conditions determined by the first image data, wherein the second imaging unit images the second main subject to obtain the second acquired image data, and the second acquired image data includes at least two pieces of parallax image data having a parallax.

2. The apparatus according to claim 1, wherein the clipping unit clips the image data of the second main subject from the at least two pieces of parallax image data obtained by the second imaging unit.

3. The apparatus according to claim 2,
wherein the clipping unit clips image data of a portion having a high degree of coincidence in the two pieces of parallax image data from one of the two pieces of parallax image data.

4. An imaging apparatus comprising:
a first imaging unit which is provided on a front face of an apparatus main body and images a first main subject to obtain first acquired image data;
a second imaging unit which is provided on a back face of the apparatus main body and images a second main subject to obtain second acquired image data;
a clipping unit which clips image data of the second main subject from the second acquired image data obtained by imaging of the second imaging unit; and
an image processing control unit which combines the first acquired image data with the image data of the second main subject clipped by the clipping unit to meet combining conditions determined by the first image data,
wherein the image processing control unit comprises a combination determining unit which determines whether combination of the image data of the second main subject clipped by the clipping unit is possible with respect to the first acquired image data based on a picture composition of the first acquired image data including at least the first main subject as the combining conditions.

5. The apparatus according to claim 4,
wherein the combination determining unit compares a position of the shaded portion of the first main subject with a position of the shaded portion of the second main subject, judges whether the position of each shaded portion is inverted, and determines that the combination is impossible if the position is inverted.

6. The apparatus according to claim 4,
wherein the combination determining unit judges whether a combination space for the second main subject based on a position of the first main subject is present in the first acquired image data as the combining conditions, and determines that the combination is impossible if the combination space is not present.

7. The apparatus according to claim 4,
wherein the combination determining unit judges whether the second acquired image data has been obtained by imaging a facial part if the second main subject is a person as the combining conditions, and determines that the combination is impossible if the facial part has not been obtained.

8. The apparatus according to claim 4,
wherein the combination determining unit judges whether the first main subject and the second main subject have been imaged at the same height position as the combining conditions, and determines that the combination is impossible if the subjects have not been imaged at the same height position.

9. An imaging apparatus comprising:
a first imaging unit which is provided on a front face of an apparatus main body and images a first main subject to obtain first acquired image data;
a second imaging unit which is provided on a back face of the apparatus main body and images a second main subject to obtain second acquired image data;
a clipping unit which clips image data of the second main subject from the second acquired image data obtained by imaging of the second imaging unit; and
an image processing control unit which combines the first acquired image data with the image data of the second main subject clipped by the clipping unit to meet combining conditions determined by the first image data,
wherein, if combining the image data of the second main subject clipped by the clipping unit with the first acquired image data is impossible, the image processing control unit informs that the combination is impossible.

10. An imaging apparatus comprising:
a first imaging unit which is provided on a front face of an apparatus main body and images a first main subject to obtain first acquired image data;
a second imaging unit which is provided on a back face of the apparatus main body and images a second main subject to obtain second acquired image data;
a clipping unit which clips image data of the second main subject from the second acquired image data obtained by imaging of the second imaging unit;
an image processing control unit which combines the first acquired image data with the image data of the second main subject clipped by the clipping unit to meet combining conditions determined by the first image data; and
a face detection unit which detects a facial part of the first main subject from the first acquired image data, wherein the combination determining unit judges whether combination of the image data of the second main subject clipped by the clipping unit is possible based on the position of the first main subject detected by the face detection unit.

11. The apparatus according to claim 5, further comprising:
a posture sensor which detects a posture of the apparatus main body,
wherein the image processing control unit judges whether the first main subject and the second main subject have been imaged at the same height position based on the posture of the apparatus main body detected by the posture sensor.

12. The apparatus according to claim 11,
wherein the posture sensor comprises an acceleration sensor or an orientation sensor.

13. An imaging system comprising:
a first imaging unit which is provided on a front face of an apparatus main body and images a first main subject to obtain first acquired image data;
a second imaging unit which is provided on a back face of the apparatus main body and images a second main subject to obtain second acquired image data;
a clipping unit which clips image data of the second main subject from the second acquired image data obtained by imaging of the second imaging unit;
an image processing control unit which combines the first acquired image data with the image data of the second main subject to meet present combining conditions, thereby creating combined image data; and a combination determining unit which makes at least one of a judgment upon a picture composition of the first acquired image data including the first main subject as the combining conditions, a judgment whether a combination space for the second main subject is present in the first acquired image; and a judgment whether combining the image data of the second main subject clipped by the clipping unit with the first acquired image data is possible.

14. The system according to claim 13, further comprising:
a face detection unit which detects a facial part of the first main subject from the first acquired image data,
wherein the combination determining unit judges whether a space for combination of the image data of the second main subject clipped by the clipping unit is present based on the position of the first main subject detected by the face detection unit, and judges whether combination of the image data of the second main subject is possible based on a result of the judgment.

15. An imaging method using an imaging apparatus, comprising:
imaging a first main subject by a first imaging unit provided on a front face of an imaging apparatus main body to obtain first acquired image data;
imaging a second main subject by a second imaging unit provided on a back face of the imaging apparatus main body to obtain second acquired image data;
clipping image data of the second main subject from the second acquired image data;
combining the first acquired image data with the clipped image data of the second main subject to create combined image data;

detecting a facial part of the first main subject from the first acquired image data; and
judging whether combining the image data of the second main subject clipped by the clipping unit with the first acquired image data is possible based on a position of the facial part in the creation of the combined image data.

16. The apparatus according to claim 6, further comprising:
a posture sensor which detects a posture of the apparatus main body,
wherein the image processing control unit judges whether the first main subject and the second main subject have been imaged at the same height position based on the posture of the apparatus main body detected by the posture sensor.

17. The apparatus according to claim 7, further comprising:
a posture sensor which detects a posture of the apparatus main body,
wherein the image processing control unit judges whether the first main subject and the second main subject have been imaged at the same height position based on the posture of the apparatus main body detected by the posture sensor.

18. The apparatus according to claim 8, further comprising:
a posture sensor which detects a posture of the apparatus main body,
wherein the image processing control unit judges whether the first main subject and the second main subject have been imaged at the same height position based on the posture of the apparatus main body detected by the posture sensor.

* * * * *